United States Patent
Millier et al.

(10) Patent No.: US 12,006,844 B2
(45) Date of Patent: Jun. 11, 2024

(54) RADIAL LOCKING OF A BLADE PIVOT WITH ADJUSTABLE ORIENTATION FOR A TURBOMACHINE FAN HUB

(71) Applicant: SAFRAN AIRCRAFT ENGINES, Paris (FR)

(72) Inventors: Vincent François Georges Millier, Moissy-Cramayel (FR); Olivier Belmonte, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 105 days.

(21) Appl. No.: 17/757,023

(22) PCT Filed: Dec. 3, 2020

(86) PCT No.: PCT/FR2020/052257
§ 371 (c)(1),
(2) Date: Jun. 8, 2022

(87) PCT Pub. No.: WO2021/116566
PCT Pub. Date: Jun. 17, 2021

(65) Prior Publication Data
US 2023/0013057 A1 Jan. 19, 2023

(30) Foreign Application Priority Data
Dec. 11, 2019 (FR) ........................... 1914180

(51) Int. Cl.
*F01D 7/00* (2006.01)
*F01D 25/16* (2006.01)
(Continued)

(52) U.S. Cl.
CPC ............... *F01D 7/00* (2013.01); *F01D 25/16* (2013.01); *F16B 21/186* (2013.01); *F16C 19/06* (2013.01);
(Continued)

(58) Field of Classification Search
CPC .......... F01D 7/00; F01D 25/16; F16B 21/186; F16C 19/06; F16C 33/60; F16C 35/06;
(Continued)

(56) References Cited

U.S. PATENT DOCUMENTS 8,827,653 B2 * 9/2014 Bouru ..................... B64C 11/48
416/204 R
10,100,653 B2 * 10/2018 Niergarth .............. F01D 5/3007
(Continued)

FOREIGN PATENT DOCUMENTS

EP 2555973 B1 2/2015
FR 3046403 A1 7/2017
(Continued)

OTHER PUBLICATIONS

French Search Report issued in French Application No. 1914180 on Aug. 25, 2020 (2 pages).
(Continued)

*Primary Examiner* — Brian P Wolcott
*Assistant Examiner* — Jesse M Prager
(74) *Attorney, Agent, or Firm* — Bookoff McAndrews, PLLC

(57) ABSTRACT

The invention relates to a blade pivot with adjustable orientation for a turbomachine fan hub, comprising a stud having means for retaining a fan blade root and coupling means for the transmission of a torsional torque, a rolling bearing for absorbing the centrifugal forces having an inner bushing mounted in transverse abutment against an external radial portion of the stud, a ring for radially retaining the stud relative to the rolling bearing housed in an annular groove formed in the stud, a plurality of clamping parts each mounted in transverse abutment against the retaining ring and in radial abutment against the inner bushing of the rolling bearing, and a clamping nut screwed onto an outer (Continued)

thread of the stud to come into conical abutment against the clamping parts such that said clamping parts ensure a clamping of the inner bushing of the rolling bearing on the stud and a clamping.

11 Claims, 9 Drawing Sheets

(51) Int. Cl.
  *F16B 21/18* (2006.01)
  *F16C 19/06* (2006.01)
  *F16C 35/063* (2006.01)
(52) U.S. Cl.
  CPC ........ *F16C 35/063* (2013.01); *F05D 2260/30* (2013.01); *F05D 2260/70* (2013.01)
(58) Field of Classification Search
  CPC ............... F16C 35/063; F05D 2260/30; F05D 2260/70; F05D 2260/79; B64C 11/06; F04D 29/056; F04D 29/323
  See application file for complete search history.

(56) References Cited

U.S. PATENT DOCUMENTS

2016/0290228 A1* 10/2016 van der Merwe ........ F01D 7/00
2018/0306039 A1* 10/2018 Kurz ....................... F02C 7/042

FOREIGN PATENT DOCUMENTS

| GB | 546621 A | 7/1942 |
| JP | S4733331 U | 12/1972 |
| WO | 2006063572 A1 | 6/2006 |
| WO | 2011124832 A1 | 10/2011 |

OTHER PUBLICATIONS

International Search Report and Written Opinion issued in International Application PCT/FR2020/052257 on Feb. 18, 2021 with English Translation (12 pages).

* cited by examiner

[Fig. 1]
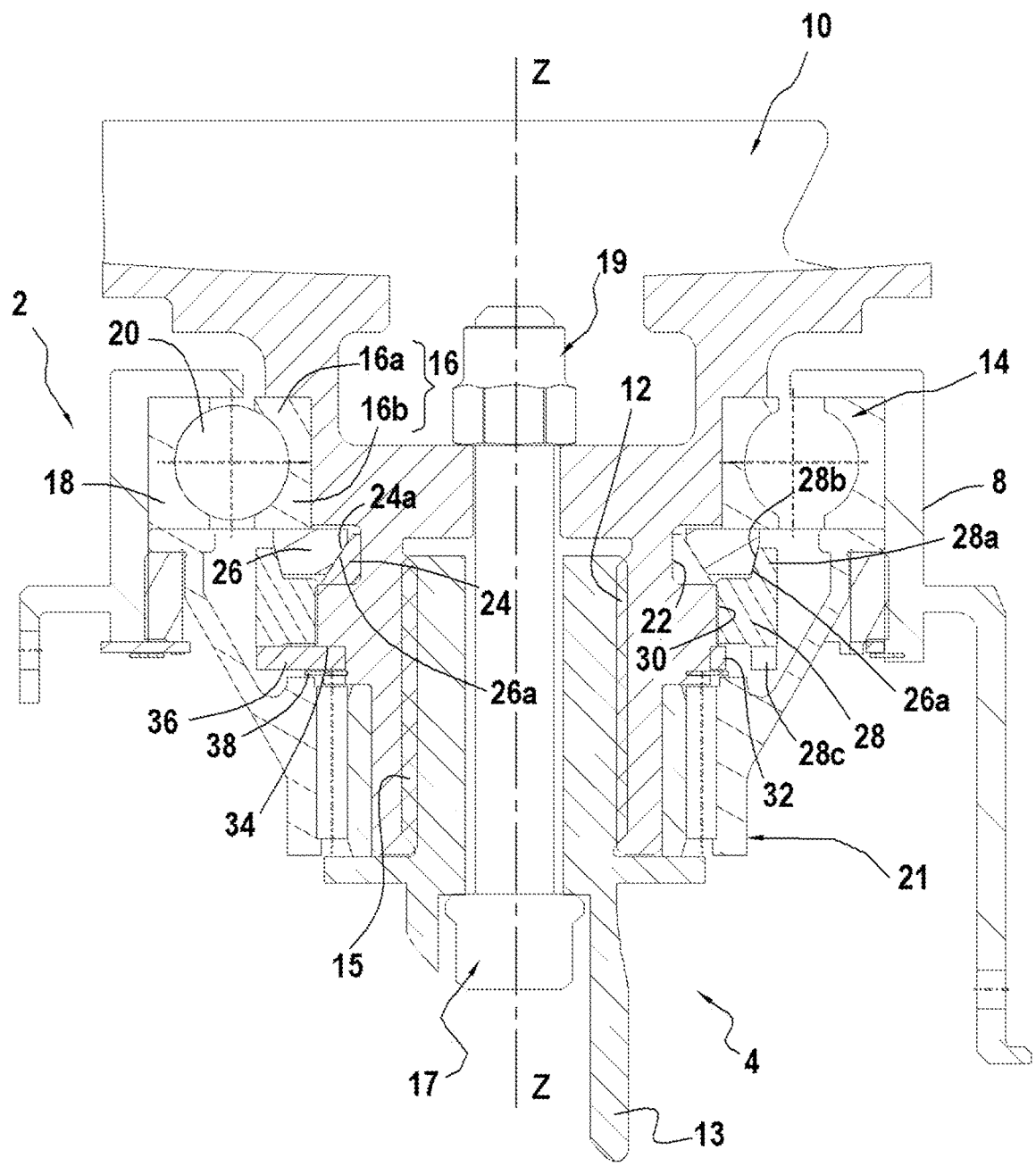

[Fig. 2]
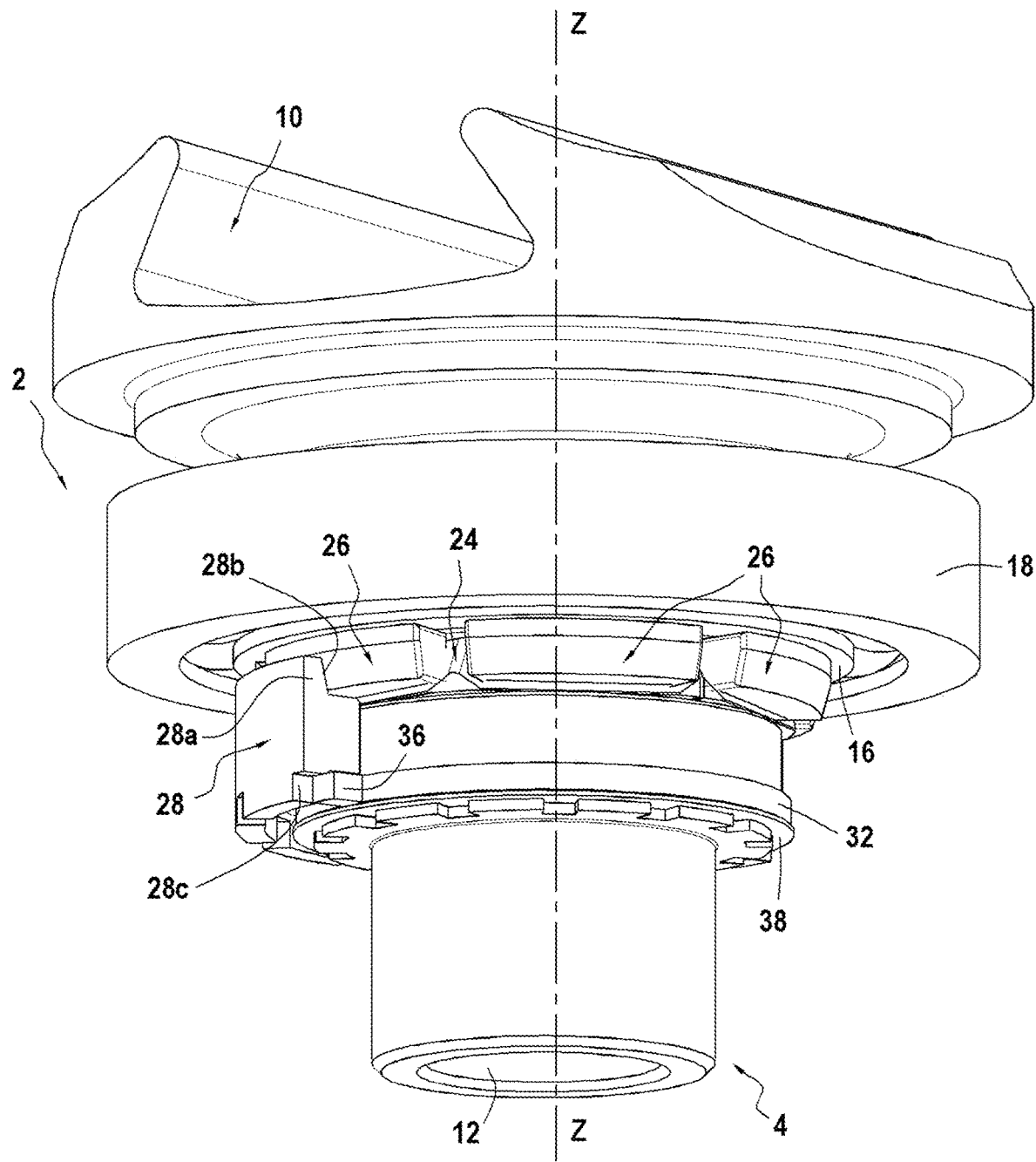

[Fig. 3A]
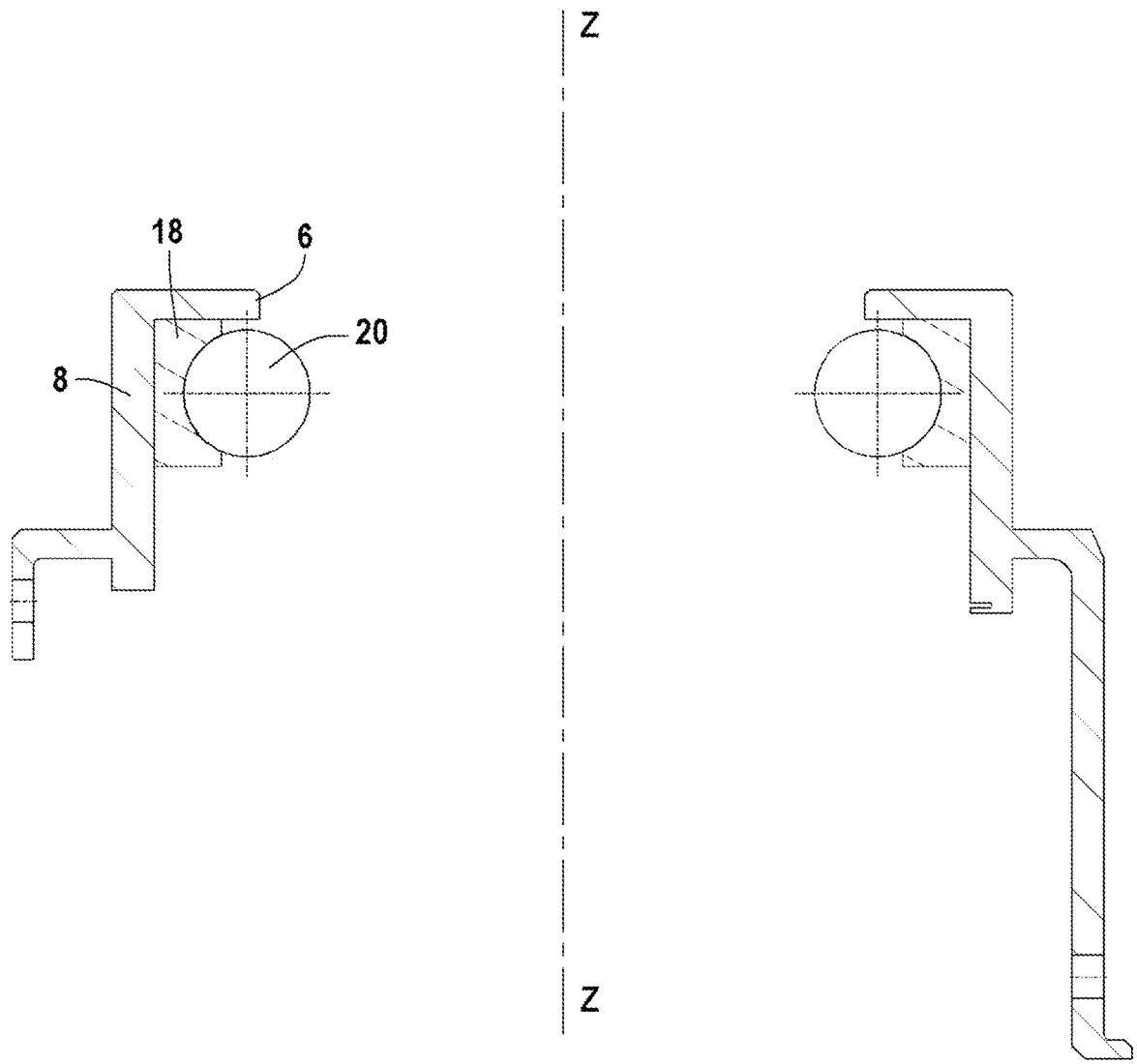

[Fig. 3B]
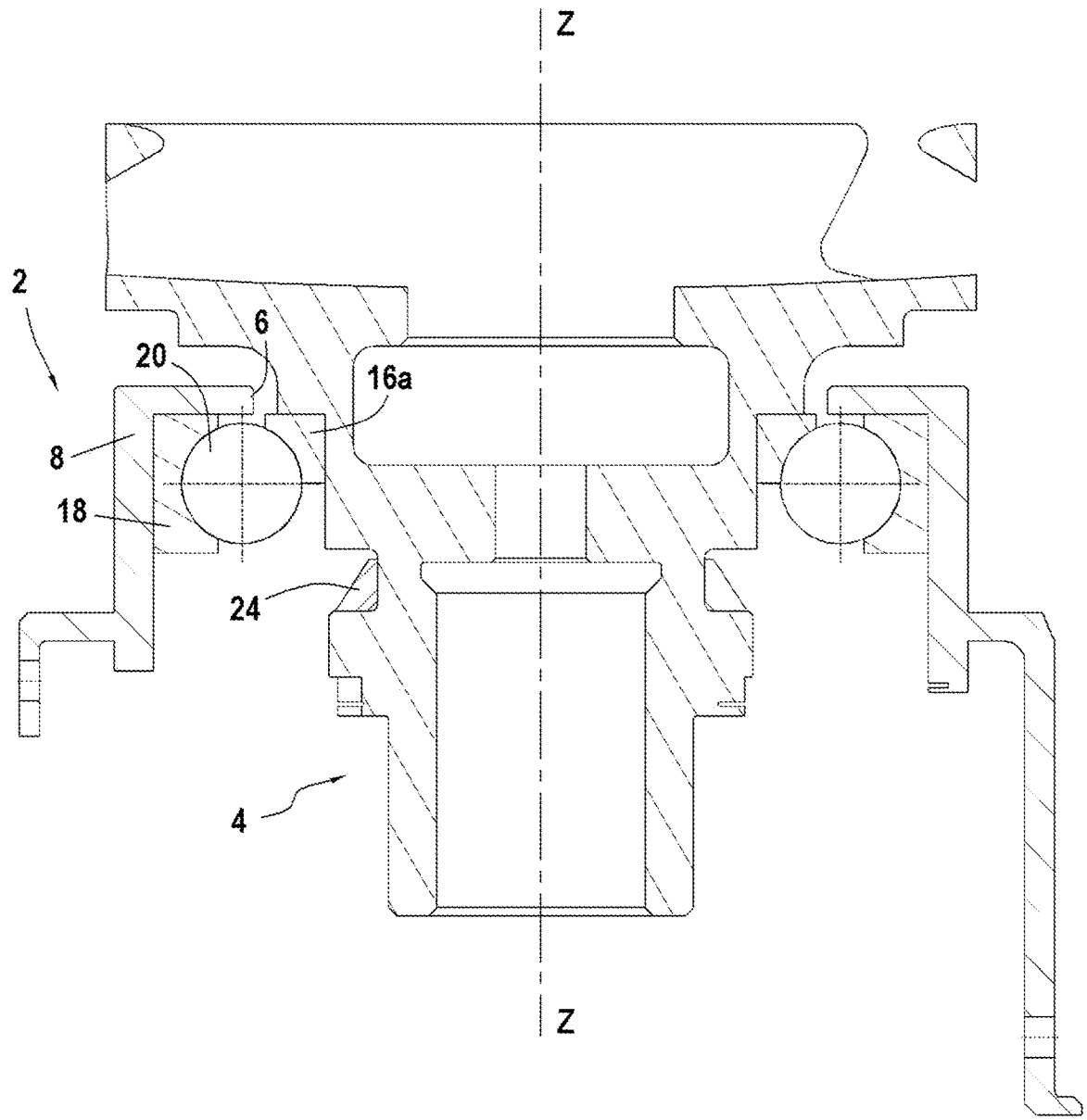

[Fig. 3C]
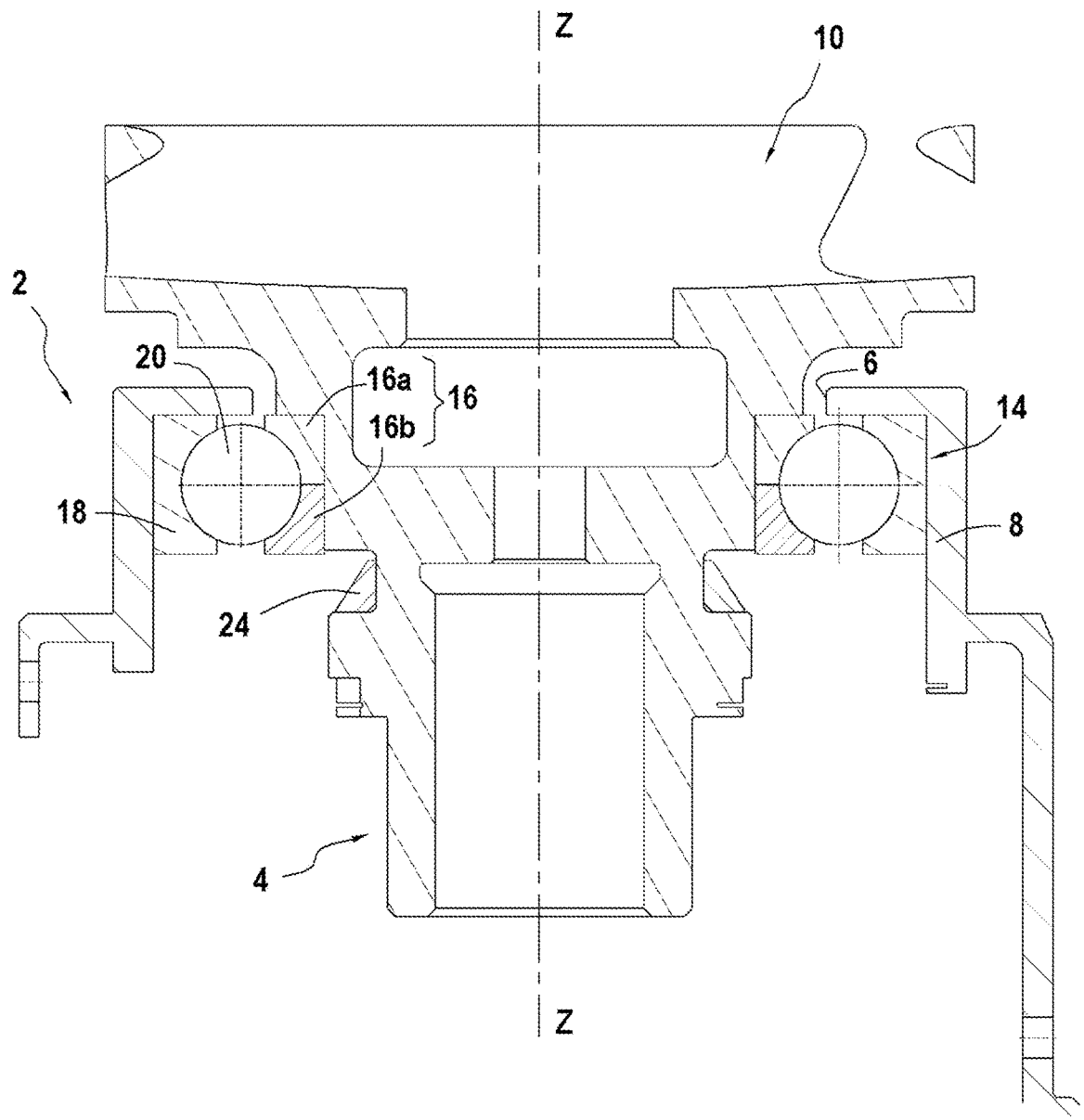

[Fig. 3D]
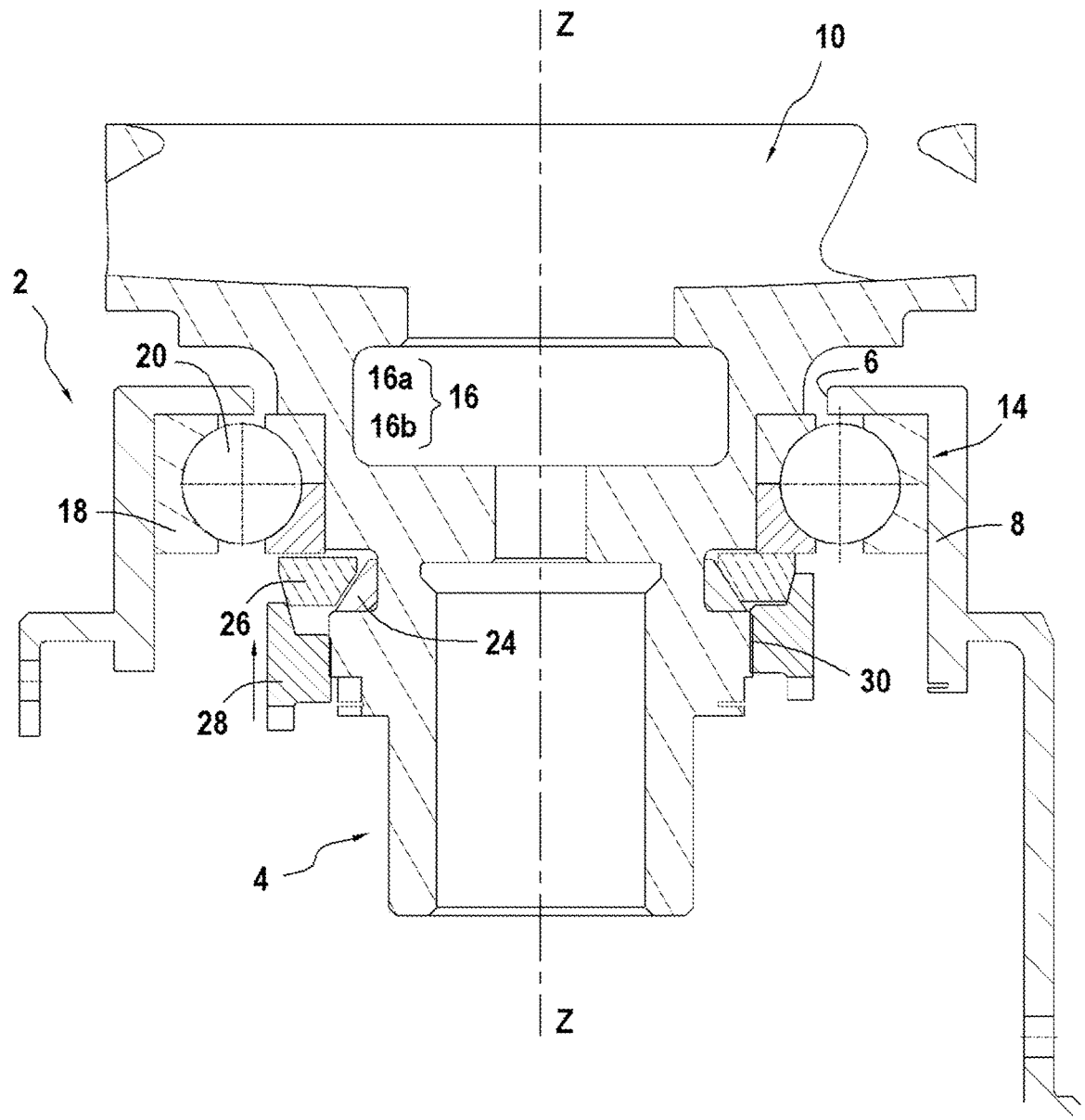

[Fig. 3E]
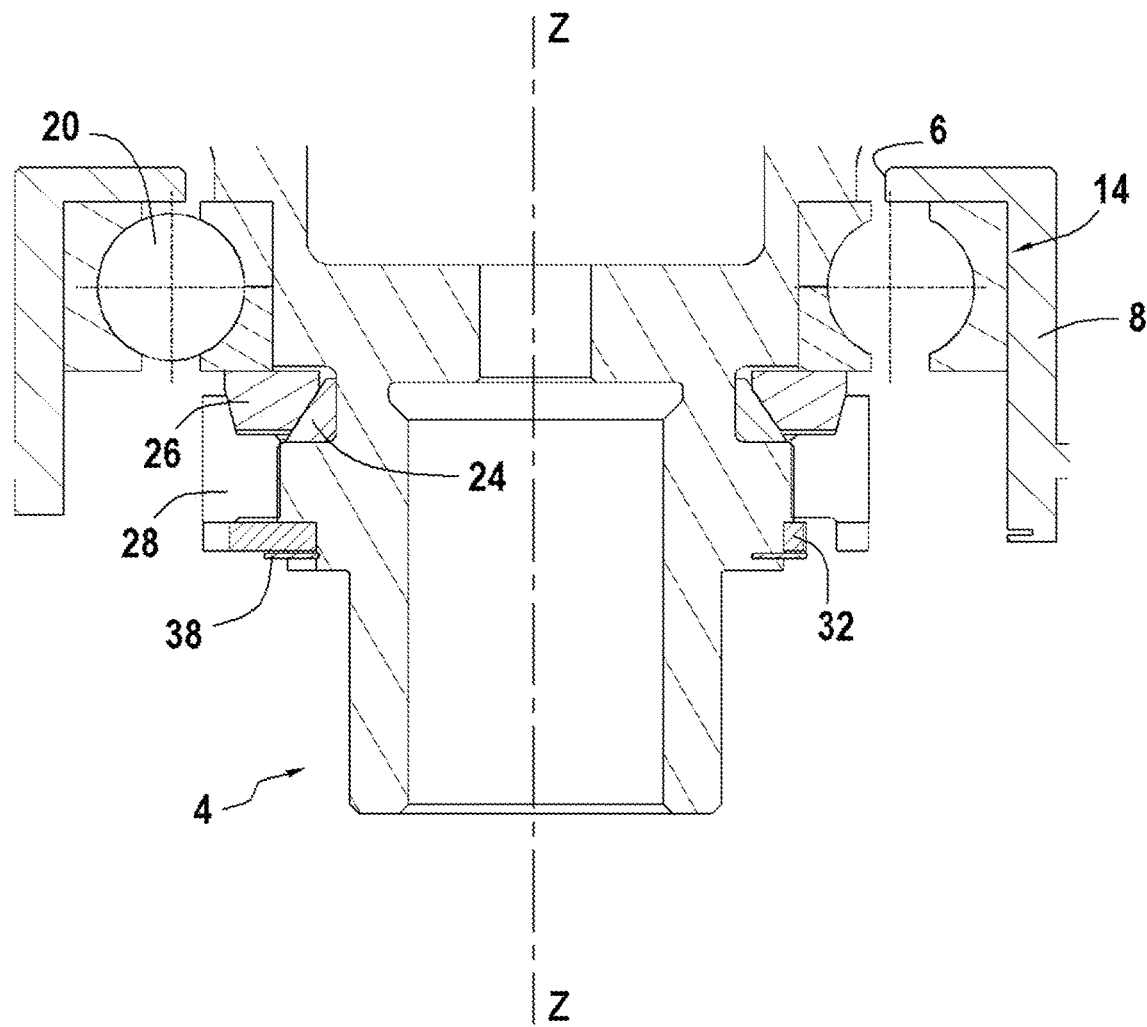

[Fig. 4A]
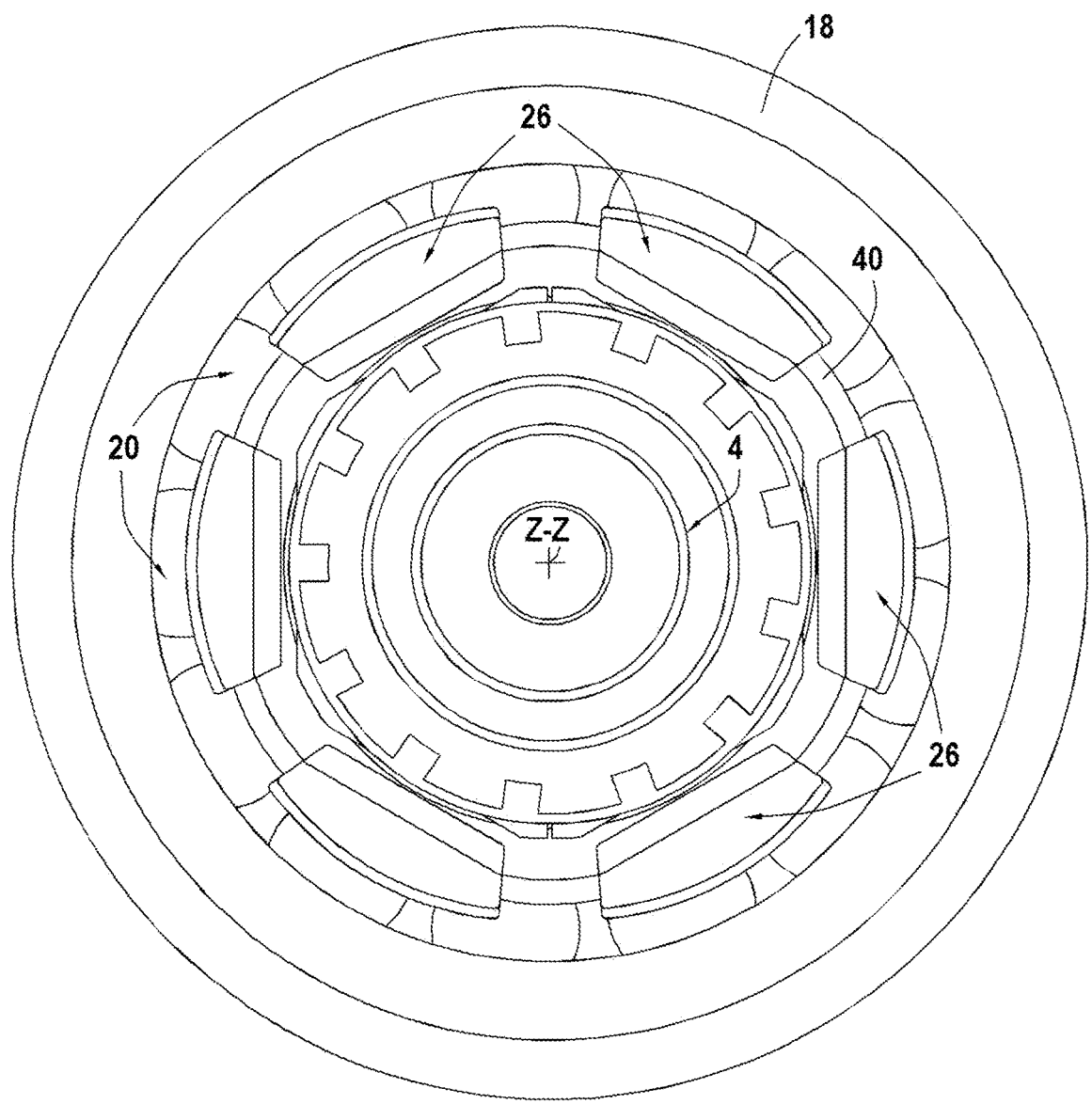

[Fig. 4B]
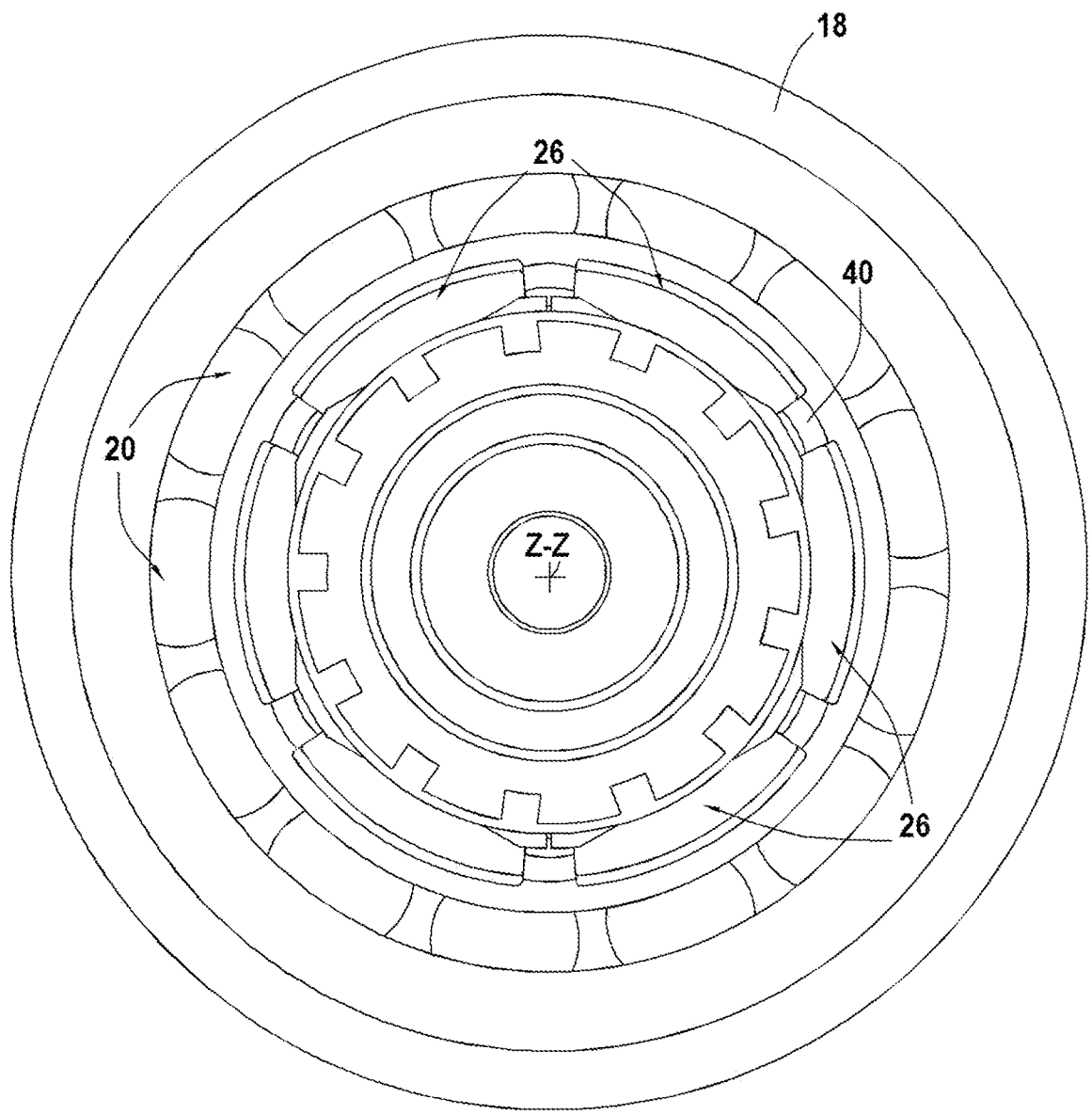

RADIAL LOCKING OF A BLADE PIVOT WITH ADJUSTABLE ORIENTATION FOR A TURBOMACHINE FAN HUB

CROSS-REFERENCE TO RELATED APPLICATIONS

This application is a National Stage Application of International Application PCT/FR2020/052257, filed on Dec. 3, 2020, now published as WO 2021/116566 A1, and which claims priority to French Patent Application No. 1914180, filed on Dec. 11, 2019.

TECHNICAL FIELD

The present invention relates to the general field of turbomachines equipped with one or two ducted or unducted fan(s), and more particularly to the control of the orientation of the fan blade(s) of these turbomachines.

A preferred field of application of the invention is that of turbojet engines comprising a fan with a very high bypass ratio (large fan diameter) and a very low pressure ratio.

PRIOR ART

The operability of a turbojet engine with a very high bypass ratio is ensured by introducing variability on the low-pressure module of the turbojet engine, this variability being activated according to the flight phases to restore a sufficient surge margin.

It is known to ensure the variability by a system for changing the setting of the fan blades which is integrated into the hub of the fan. Such a blade setting change system also allows ensuring the thrust reversal function which is, with this type of turbojet engine, no longer performed by the nacelle of the engine.

Furthermore, in the fan module of a turbojet engine with a very high bypass ratio, the radial retention of the fan blades is generally ensured by the shape of the vane root and of the cell that receives it, by a pivot and its rolling bearings to absorb all the forces to which the blade is subjected, by the hub of the fan in which the set of pivots is integrated, and by the fan casing.

For example, reference may be made to the publication FR 3,046,403 which describes one example of such architecture for holding the fan blades. More specifically, in this publication, the radial retention of each blade consists of a pivot comprising a bulb-shaped attachment, an external rolling bearing and an internal rolling bearing which allow absorbing the aerodynamic, inertial and centrifugal forces undergone by the blade and its pivot, an eccentric connected by splines to the pivot, and a hub integrating the set of pivots.

Furthermore, it is generally provided to ensure the radial retention of the pivot relative to the rolling bearing block by means of a segmented retaining ring. More specifically, it is known to house the retaining ring in a groove of the pivot under the internal bushing of the external rolling bearing, this groove being wider than the retaining ring in order to accommodate the tolerance dispersions in each of the pivot parts. An annular part holds the retaining ring in the groove in order to prevent its disengagement.

Such radial retention of the pivot has drawbacks. Due to the mounting tolerances of the retaining ring, the entire pivot, when stopped, "falls" and consumes this residual mounting clearance, which creates contact wear on the inner bushings of the rolling bearings.

In addition, when the engine is rotated, before the centrifugal force is absorbed by the retaining ring, the forces pass through propagation paths other than those provided (for example through the threads), which can be critical for the impacted parts that are not dimensioned to hold such heavy loads.

DISCLOSURE OF THE INVENTION

The main purpose of the present invention is therefore to propose a blade pivot with adjustable orientation which does not have the aforementioned drawbacks, in particular by eliminating any residual mounting clearance.

In accordance with the invention, this purpose is achieved thanks to a blade pivot with adjustable orientation for a turbomachine fan hub, comprising:
- a stud extending along a radial axis and having, at an external radial end, means for retaining a fan blade root and, at an internal radial end, coupling means for the transmission of a torsional torque;
- a rolling bearing for absorbing the centrifugal forces having an inner bushing mounted in transverse abutment against an external radial portion of the stud;
- a ring for radially retaining the stud relative to the rolling bearing housed in an annular groove formed in the stud;
- a plurality of clamping parts each mounted in transverse abutment, that is to say along a direction orthogonal to the radial axis, against the retaining ring and in radial abutment, that is to say along the radial axis, against the inner bushing of the rolling bearing; and
- a clamping nut screwed onto an outer thread of the stud to come into conical abutment against the clamping parts such that said clamping parts ensure a clamping of the inner bushing of the rolling bearing on the stud and a clamping of the retaining ring in the groove.

The pivot according to the invention is remarkable in that it provides for radial retention of the stud by means of a "keystone" type clamping. During the clamping of the clamping nut, the latter will drive the clamping parts that will slide radially outwardly until they come into contact with the inner bushing of the rolling bearing. The clamping parts are then forced to re-center inwardly until they come into contact with the retaining ring housed in the groove of the stud.

Thus, the invention allows having a system for retaining the stud relative to the rolling bearing which overcomes the usual mounting clearances. In this way, the forces (in particular centrifugal forces) always pass through the same path, which prevents any other part from absorbing the heavy loads due to these forces. This results in perfect holding of the stud, in operation as well as when the engine is stopped, while eliminating any wear on the parts of the pivot.

Preferably, the retaining ring comprises a plurality of planar faces which each form a planar/planar contact with a corresponding planar face of the clamping parts so as to optimize the contact between the retaining ring and the clamping parts.

In this case, the clamping parts advantageously each comprise a frustoconical face opposite to their planar face and coming into conical abutment with the clamping nut.

The pivot can comprise six clamping parts evenly spaced about a radial axis of the pivot.

Also preferably, the retaining ring comprises two distinct ring segments in order to allow its mounting on the stud.

Still preferably, the pivot further comprises a system for locking the clamping nut on the stud. This locking system can comprise an anti-rotation ring housed in a shoulder of the stud and a circlip mounted against the anti-rotation ring.

The invention also relates to a blade with variable setting angle for a turbomachine fan hub, comprising an airfoil and a pivot as defined above.

The invention also relates to a turbomachine comprising at least one fan hub and at least one set of blades with variable setting angle as defined previously.

The invention also relates to a method for mounting a pivot as defined above, comprising successively:
 a—the lowering of the stud in a fan hub previously provided with the external rolling bearing, the stud being previously provided with the retaining ring;
 b—the positioning of the clamping parts opposite the retaining ring;
 c—the screwing of the clamping nut on the outer thread of the stud; and
 d—the locking of the clamping nut on the stud.

Preferably, the clamping parts are secured beforehand by means of links made of elastomeric material linking them to each other, which then allows facilitating the mounting.

BRIEF DESCRIPTION OF THE DRAWINGS

FIG. 1 is a sectional view showing a vane pivot with adjustable orientation according to the invention.

FIG. 2 is a partial cutaway perspective view of the pivot of FIG. 1.

FIG. 3A represents a first step of one example of a mounting according to the invention of the pivot of FIG. 1.

FIG. 3B represents a second step of the example of the mounting of the pivot of FIG. 1.

FIG. 3C represents a third step of the example of the mounting of the pivot of FIG. 1.

FIG. 3D represents a fourth step of the example of the mounting of the pivot of FIG. 1.

FIG. 3E represents a fifth step of the example of the mounting of the pivot of FIG. 1.

FIG. 4A represents a partial and bottom view of a pivot according to one alternative embodiment of the invention in a free state.

FIG. 4B represents a partial and bottom view of a pivot according to one alternative embodiment of the invention in an assembled state.

DESCRIPTION OF THE EMBODIMENTS

The invention applies to any turbomachine equipped with at least one ducted or unducted fan, and whose fan blades (in the case of a ducted fan) or propeller vanes (in the case of a unducted fan) are equipped with a pitch setting system.

The invention particularly applies to turbojet engines of the type comprising a fan with a very high bypass ratio (large fan diameter) and a very low pressure ratio.

The architecture of these types of turbojet engines is well known to those skilled in the art and will therefore not be described in detail here. Briefly, these turbojet engines comprise a large-diameter ducted fan which is provided with a system for changing the pitch setting of the fan blades.

Such a pitch setting change system can for example comprise lever arms (or eccentrics) coupled to each blade pivot and pivotally actuated by a cylinder.

More specifically, the function of the pivot of each blade is to ensure the retention of the fan blade on a rotary fan hub and to guide it for the setting of its pitch.

To this end, the pivot of each fan blade is mounted radially in an orifice of the hub of the fan which passes right therethrough, the hub being centered on the longitudinal axis of the turbojet engine.

As represented in FIGS. 1 and 2, the pivot 2 of the fan blade according to the invention comprises several distinct elements which are assembled together so as to facilitate its mounting on/dismounting from the hub of the propeller.

Particularly, the pivot 2 comprises a stud 4 which extends along the radial axis Z-Z of the pivot through an orifice 6 of the hub 8 of the fan. This stud 4 has, at an external radial end (that is to say at its end furthest from the longitudinal axis of the turbojet engine), a bulb-shaped attachment 10 which is intended to receive a foot (not represented) of the fan blade. Of course, other means for retaining the root of the blade could be envisaged.

At its internal radial end (that is to say at its end closest to the longitudinal axis of the turbojet engine), the stud 4 comprises an orifice 12 centered on the radial axis Z-Z and intended to receive a setting transmission bushing 13 to transmit the torsional torque to the pivot of the blade to change its setting pitch.

The setting transmission bushing 13 is coupled to the orifice 12 via splines 15. This setting transmission bushing 13 is intended to transmit the torsional torque to the pivot of the blade to change its setting pitch. It is locked on the stud by means of a screw 17 centered on the radial axis Z-Z and of a nut 19 clamped on said screw.

The pivot according to the invention further comprises a rolling bearing for the absorption of the centrifugal forces (that is to say along the radial axis Z-Z) seen by the blade and its pivot.

More specifically, the pivot according to the invention comprises an external rolling bearing 14 for the absorption of the centrifugal forces. This rolling bearing is a ball bearing. It is provided with an inner bushing 16 which is mounted in transverse abutment against the external radial end of the stud 4.

Preferably, the inner bushing 16 is formed of two distinct portions 16a, 16b. This characteristic allows facilitating the mounting of the pivot as will be detailed later.

The external rolling bearing 14 also comprises an outer bushing 18 which is mounted in transverse abutment inside the orifice 6 of the hub 8 of the fan, the inner 16 and outer 18 bushings defining rolling tracks for a plurality of balls 20.

To absorb the transverse forces, the pivot can comprise a needle or roller bearing 21 which is offset radially inwardly relative to the external rolling bearing 14.

The pivot according to the invention also comprises means for radially retaining the stud 4 relative to the block formed by the external rolling bearing 14.

To this end, the stud 4 comprises, at its external surface, an annular groove 22 positioned below the inner bushing 16 of the external rolling bearing 14.

A retaining ring 24 is housed in this groove 22. This retaining ring is preferably made of two distinct ring segments in order to facilitate its mounting.

In addition, a plurality of clamping parts 26 are each mounted in transverse abutment against the retaining ring 24 and in radial abutment against the inner bushing 16 of the external rolling bearing. The clamping parts 26 are for example six in number and are preferably evenly spaced about the radial axis Z-Z.

The transverse abutment between the retaining ring 24 and the clamping parts 26 is preferably achieved by means of "planar/planar" contacts along a direction orthogonal to the radial axis Z-Z. To this end, the retaining ring 24 comprises as many planar faces 24a as there are clamping parts 26, these planar faces 24a being in contact with corresponding planar faces 26a of the clamping parts.

The radial abutment between the retaining ring 24 and the inner bushing 16 of the external rolling bearing is also achieved by means of a "planar/planar" contact, this time along the radial axial direction Z-Z.

The means for radially retaining the stud also comprise a clamping nut 28 which is screwed onto an outer thread 30 of the stud 4 positioned below the groove 22 receiving the retaining ring 24.

This clamping nut 28 comprises an annular shoulder 28a provided inside a frustoconical face 28b coming into contact with a corresponding frustoconical face 26b of the clamping parts (the frustoconical face 26b of the clamping parts is opposite to their planar face 26a) to achieve a conical abutment.

Thus, during the screwing of the clamping nut 28, the shoulder 28a thereof will come into conical abutment against the clamping parts 26. Due to this conical abutment, the clamping parts will tend to slide radially outwardly to come into radial abutment against the inner bushing 16 of the external rolling bearing. In addition, the clamping parts will also tend to be re-centered towards the radial axis Z-Z, so as to come into transverse abutment against the retaining ring 24.

In this way, the screwing of the clamping nut causes a clamping of the inner bushing 16 of the external rolling bearing on the stud 4 and a clamping of the retaining ring 24 in the groove of the stud. Any mounting clearance can therefore be eliminated.

Advantageously, the pivot according to the invention further comprises a system for locking the clamping nut 28 on the stud 4.

As represented in FIGS. 1 and 2, this locking system can comprise an anti-rotation ring 32 which is housed in a shoulder 34 of the stud provided for this purpose.

The anti-rotation ring 32 is provided with at least one finger 36 which is housed in a notch 28c of the clamping nut 28 to prevent it from pivoting about the radial axis Z-Z. A circlip 38 is mounted radially under the anti-rotation ring to hold the latter in position in the shoulder 34 of the stud.

In relation to FIGS. 3A to 3E, an example of mounting of the pivot according to the invention will now be described.

During a first step illustrated by FIG. 3A, the outer bushing 18 of the external rolling bearing is mounted in transverse abutment inside the orifice 6 of the hub 8 of the fan (it is for example shrink-fitted), then the balls 20 of this rolling bearing are mounted.

As represented in FIG. 3B, the stud 4 is then lowered radially into the orifice 6 of the hub 8, the stud being previously provided with a portion 16a of the inner bushing of the external rolling bearing and with the retaining ring 24.

The other portion 16b of the inner bushing of the external rolling bearing 14 is then mounted to form the inner bushing 16 (FIG. 3C).

During the next step, the system for radially retaining the stud is assembled. At first, the clamping parts 26 are positioned opposite the retaining ring 24 and the clamping nut 28 is screwed onto the thread 30 of the stud 4 (FIG. 3D).

Finally, the set is locked on the stud by mounting the anti-rotation ring 32 on the stud, the latter being itself held in place using the circlip 38 (FIG. 3E).

In relation to FIGS. 4A and 4B, one alternative embodiment of the pivot according to the invention will now be described in which the clamping parts 26 are secured to each other by means of links made of elastomeric material 40 linking them to each other.

FIG. 4A more specifically represents one embodiment of these links made of elastomeric material 40 when the engine is stopped (free state). During the clamping of the clamping nut, the links made of elastomeric material 40 collapse inwardly of the pivot (assembled state— FIG. 4B).

In one alternative embodiment, it is possible to consider making these clamping part securing means by additive manufacturing by replacing the links with deformable supports.

The invention claimed is:

1. A blade pivot with adjustable orientation for a turbomachine fan hub, comprising:
    a stud extending along a radial axis (Z-Z) and having, at an external radial end, means for retaining a fan blade root and, at an internal radial end, coupling means for transmitting a torsional torque;
    a rolling bearing for absorbing centrifugal forces having an inner bushing mounted in transverse abutment against an external radial portion of the stud;
    a ring for radially retaining the stud relative to the rolling bearing housed in an annular groove formed in the stud;
    a plurality of clamping parts each mounted in transverse abutment, along a direction orthogonal to the radial axis (Z-Z), against the retaining ring and in radial abutment, along the radial axis (Z-Z), against the inner bushing of the rolling bearing; and
    a clamping nut screwed onto an outer thread of the stud to come into conical abutment against the plurality of clamping parts such that the plurality of clamping parts ensure a clamping of the inner bushing of the rolling bearing on the stud and a clamping of the retaining ring in the groove.

2. The pivot according to claim 1, wherein the retaining ring comprises a plurality of planar faces which each form a planar/planar contact with a corresponding planar face of each clamping part of the plurality of clamping parts.

3. The pivot according to claim 2, wherein each clamping part of the plurality of clamping parts comprise a frustoconical face opposite to their planar face and coming into conical abutment with the clamping nut.

4. The pivot according to claim 1, wherein the plurality of clamping parts comprises six clamping parts evenly spaced about a radial axis (Z-Z) of the pivot.

5. The pivot according to claim 1, wherein the retaining ring comprises two distinct ring segments in order to allow its mounting on the stud.

6. The pivot according to claim 1, further comprising a system for locking the clamping nut on the stud.

7. The pivot according to claim 6, wherein the locking system comprises an anti-rotation ring housed in a shoulder of the stud and a circlip mounted against the anti-rotation ring.

8. A blade comprising an airfoil and the blade pivot according to claim 1.

9. A turbomachine comprising the blade according to claim 8 and the turbomachine fan hub.

10. A method for mounting the pivot according to claim 1, comprising successively:
    a—lowering the stud in a fan hub previously provided with the rolling bearing, the stud being previously provided with the retaining ring;
    b—positioning the clamping parts opposite the retaining ring;

c—screwing of the clamping nut on the outer thread of the stud; and d—locking the clamping nut on the stud.

11. The method according to claim 10, wherein the plurality of clamping parts are secured beforehand by means of links made of elastomeric material linking them to each other.

\* \* \* \* \*